United States Patent [19]

Ford

[11] Patent Number: 4,998,319
[45] Date of Patent: Mar. 12, 1991

[54] CARPET GRIPPING DEVICE FOR USE UNDER AN OVERLAYED FLOOR COVERING

[76] Inventor: Christopher Ford, 34432 Jefferson, Ste. 14, Mt. Clemens, Mich. 48045

[21] Appl. No.: 359,322

[22] Filed: May 31, 1989

[51] Int. Cl.$^5$ .................. B32B 3/06; A47G 27/04
[52] U.S. Cl. .................................... 16/8; 16/4
[58] Field of Search ........................... 16/8, 4

[56] References Cited

U.S. PATENT DOCUMENTS

| | | |
|---|---|---|
| 398,492 | 2/1889 | Caldwell . |
| 456,002 | 7/1891 | Lincoln . |
| 605,978 | 5/1898 | Shepherd . |
| 833,571 | 10/1906 | Bailey . |
| 883,771 | 4/1908 | Alden . |
| 1,101,318 | 6/1914 | Myers . |
| 1,224,615 | 5/1917 | Doyle . |
| 1,598,127 | 8/1926 | Fleming . |
| 1,931,256 | 10/1933 | Gundelach . |
| 2,160,134 | 5/1939 | Fanning . |
| 2,184,019 | 12/1939 | Owens . |
| 2,250,669 | 7/1941 | Jamgotchian . |
| 2,631,327 | 3/1953 | Roberts . |
| 2,732,579 | 1/1956 | Farr . |
| 2,779,048 | 1/1957 | Larabell . |
| 2,821,714 | 2/1958 | Kent et al. . |
| 2,862,227 | 12/1958 | Larabell . |
| 3,029,173 | 4/1962 | Reinhard . |
| 3,158,893 | 12/1964 | Smith . |
| 3,314,119 | 4/1967 | Hill . |
| 3,413,678 | 12/1968 | Krantz . |
| 3,494,006 | 2/1970 | Brumlik . |
| 3,528,123 | 9/1970 | Dipelesi . |
| 3,538,536 | 11/1970 | Pecorella . |
| 3,577,581 | 5/1971 | Stata . |
| 3,673,633 | 7/1972 | Frebraro . |
| 3,760,454 | 9/1973 | Heinzel et al. . |
| 3,817,015 | 6/1974 | Frangos . |
| 3,828,391 | 8/1974 | Sutton et al. . |
| 3,840,945 | 10/1974 | Brumlik . |
| 3,858,268 | 1/1975 | Pollak . |
| 3,858,269 | 1/1975 | Sutton et al. . |
| 3,950,816 | 4/1976 | Hill . |
| 4,751,764 | 6/1988 | Reuben .................... 16/8 |
| 4,829,627 | 5/1989 | Altus et al. ............... 16/8 |

FOREIGN PATENT DOCUMENTS

| | | |
|---|---|---|
| 2264963 | 10/1975 | Fed. Rep. of Germany . |
| 564336 | 6/1975 | Switzerland . |
| 1156075 | 6/1969 | United Kingdom . |

Primary Examiner—Richard K. Seidel
Assistant Examiner—Carmine Cuda
Attorney, Agent, or Firm—Harness, Dickey & Pierce

[57] ABSTRACT

A carpet gripping device which has a base member and a plurality of generally rigid prongs protruding therefrom. Each prong being bent at an angle and the exposed end cut flat so as not to leave a point. The device is then securely fastened to the underside of an overlayed floor covering so that the prongs are directed downward into a carpeted floor to prevent relative movement between the overlayed floor covering and the carpeted floor beneath it.

9 Claims, 2 Drawing Sheets

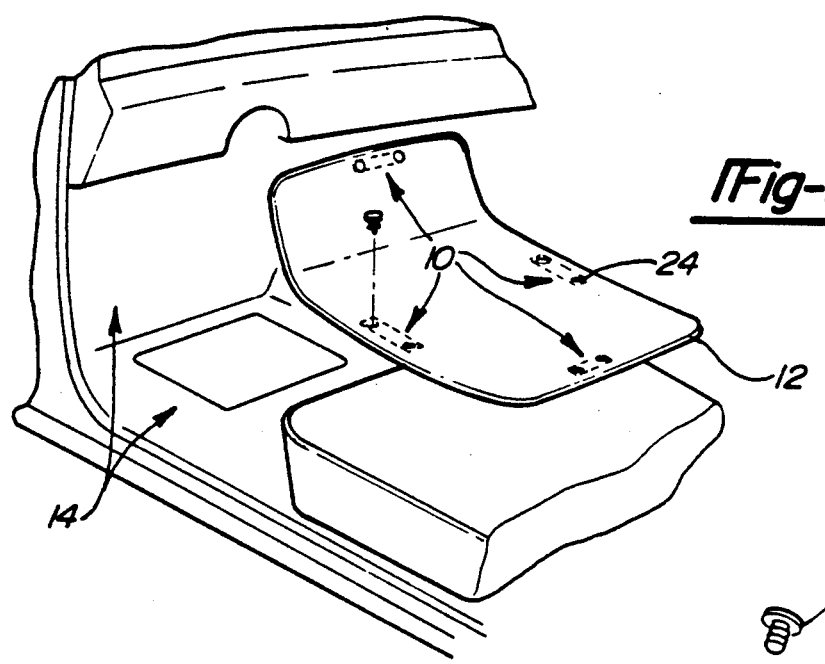
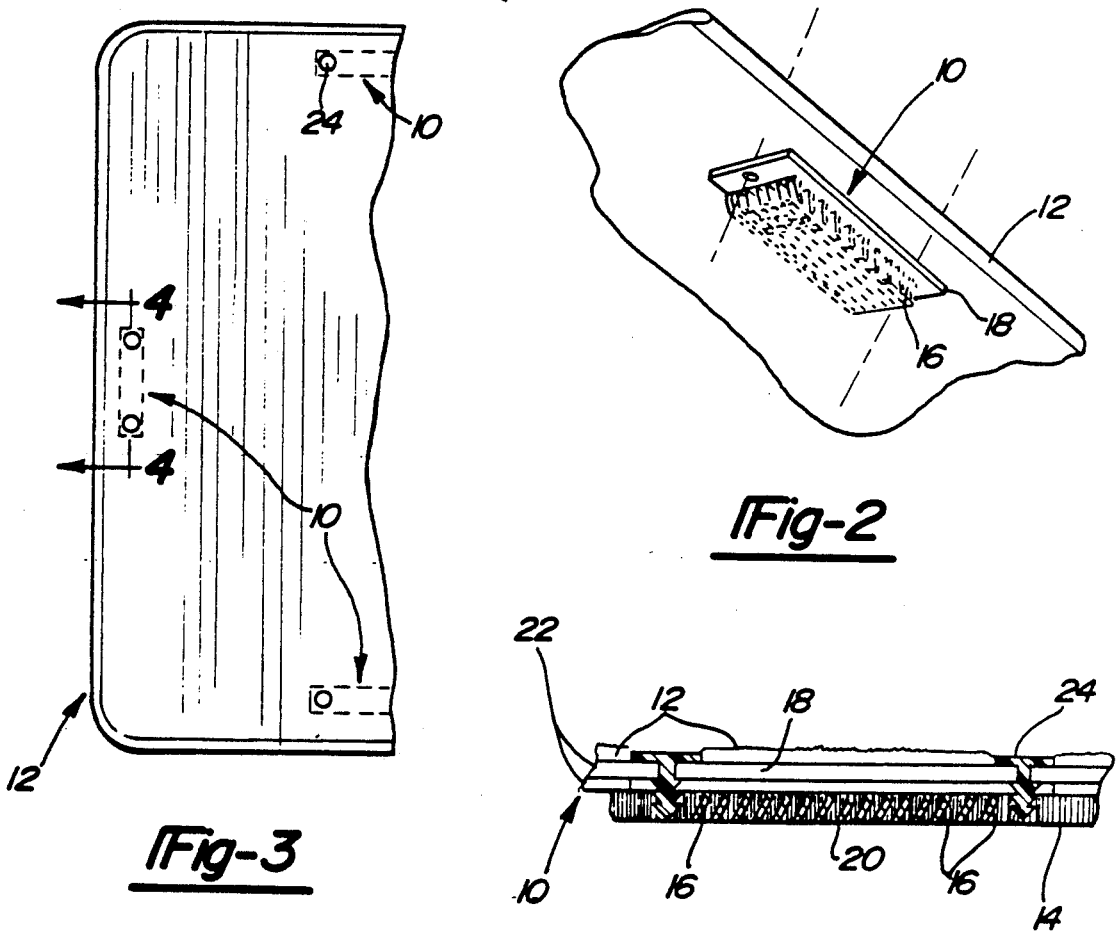
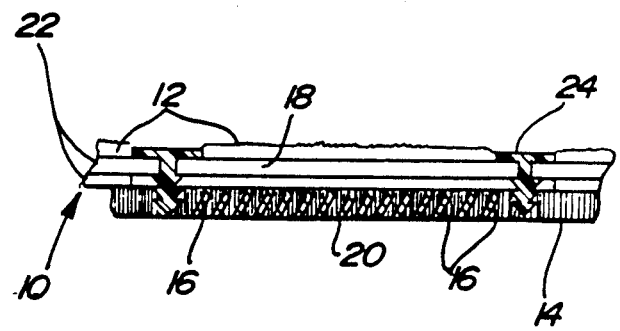

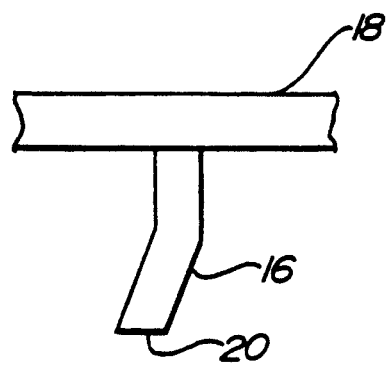
_Fig-5_
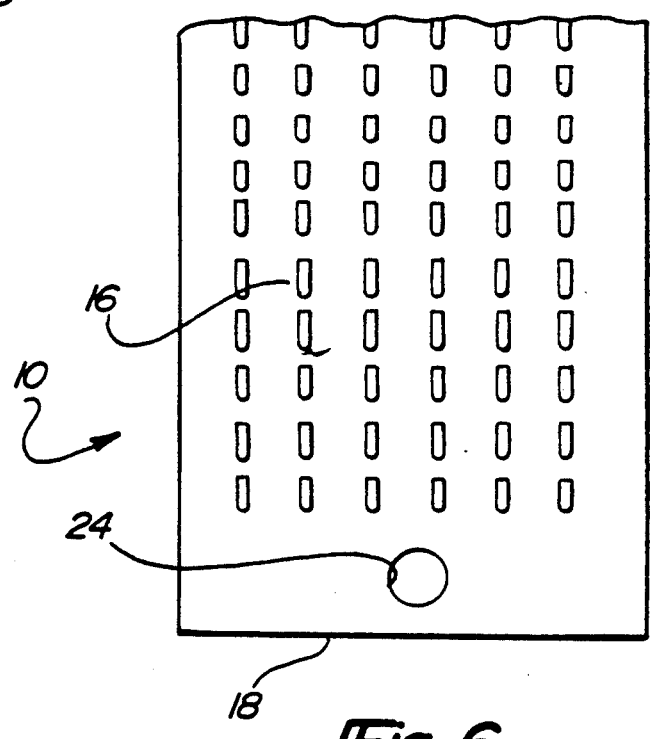
_Fig-6_
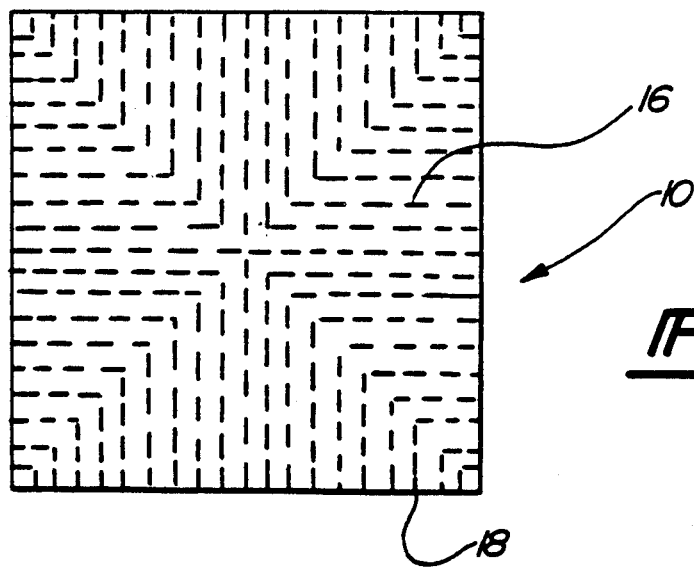
_Fig-7_

CARPET GRIPPING DEVICE FOR USE UNDER AN OVERLAYED FLOOR COVERING

TECHNICAL FIELD

The present invention generally relates to a carpet gripping device for an overlayed floor covering and, more particularly, is concerned with a product for holding an automobile floor mat in place on a carpeted automobile floor.

DISCUSSION

Various kinds of carpet-gripping devices have been in existence almost since carpet itself was first introduced. It was recognized that just like a wooden floor or tile floor, or floor of any kind, when a floor covering of some type was placed on the floor it would have a tendency to move from its original placement or to curl up due to heavy traffic or everyday use. Various ideas have been implemented to avoid this problem. No solution, to date, has been widely accepted.

Although any overlayed floor covering, to be used on a carpeted floor, could benefit from the present invention, its primary purpose is for use on automobile floor mats that lay on a carpeted automobile floor. Because automobile floors are normally not flat but have various angles and contours and because of the repeated action of getting into and out of an automobile, a device is needed that will firmly hold the mat in place. Further considerations to be kept in mind are: ease and expense of manufacturing such a device; durability of the device; protection of the carpeted floor or any other surface that may come into contact with the device; installation of the device in such a way that the device itself does not move relative to the carpeted floor and/or the overlayed floor covering; and simple means for installing the device.

Previous carpet-gripping devices in this area have failed to consider all of the objectives outlined above. The present invention is the only one of its kind that answers all of the stated objectives. In the past, some carpet-gripping devices had prongs which extended upward into the overlayed floor covering and prongs which extended downward into the carpeted floor. The problem here is that to have prongs extending up and down makes the device more difficult to manufacture, also the device was not permanently attached to the overlayed floor covering. By not being permanently attached to the overlayed floor covering, there is the chance that the device will itself move relative to the overlayed floor covering and the carpeted floor. Another problem of having carpet-gripping devices which are not securely fastened to the overlayed floor covering is that they become just another item to worry about losing. Many of the devices in the past were designed to lay beneath the entire surface of the overlayed floor covering. An anti-slip surface prevented the overlayed rug from moving. The present invention only attaches to a few very small areas under the overlayed floor covering and therefore, expense is less and installation is simpler. Neither does the present invention rely on any anti-slip surface between the device and the overlayed floor covering. In most, if not all of the previous devices the prongs were designed to have sharp pointed ends. Such sharp pointed prongs have several disadvantages, including the possibility of causing undue wear of the carpeted floor. Some of the previous devices relied on the use of adhesive tape on the base member, which, over time, could lose its adhesive qualities. Additionally heavy traffic may cause the adhesive-based device to be moved relative to the carpeted floor and the overlayed floor covering.

Consequently, a need exists to substantially improve the previous carpet gripping devices. A device is needed that will be relatively easy and inexpensive to manufacture; one that will be durable; one that will offer protection to any surface that it may come into contact with; one that will be installed securely to the overlayed floor covering so that it will not move relative to the overlayed floor covering; and a device that will be simple to install onto the overlayed floor covering.

SUMMARY OF THE INVENTION

The present invention provides a carpet gripping device designed to satisfy each of the aforementioned objectives. In accordance with the teachings of this invention, a carpet gripping device is provided which comprises a substantially flat base member with a plurality of prongs extending therefrom which inhibit the relative movement between an overlayed floor covering and the carpeted floor beneath it and which has means for securely connecting the base member to the underside of the overlayed floor covering, means for protecting surfaces that the device may come in contact with, and which has the prongs directed downward into the carpeted floor.

The prongs extending from the base member are bent at a slight angle which enables them to actually grip the carpeted floor. Another feature of the device which aids in gripping the carpeted floor is the relatively dense arrangement of the prongs on the base member. This also tends to protect any surface coming in contact with the prongs because any force on the device will be distributed over many prongs instead of just a few.

The prongs should be generally rigid, which makes them durable and assists the gripping action of the device. The exposed ends of each prong should be cut flat instead of having pointed ends which could damage a surface coming in contact with the prongs. Variations could be made with the orientation of the prongs. All prongs could flow in the same direction which would inhibit movement against the flow of the prongs or the prongs could be arranged so that they flow in different directions.

An advantage of the present invention is that it can be made relatively small in size and still be very effective. A small device is easy to hide from view and can be economically made, packaged, and shipped. A single device may be all that is necessary under an overlayed floor covering or a greater number could be used if more gripping action is required for a particular application. Another benefit of the present invention is that each device is physically independent of any other device. Therefore, no connections exist between devices to maintain and if for some reason one device were to come unattached to the overlayed floor covering, or shift off of a carpeted floor, the other device(s) would still function normally.

BRIEF DESCRIPTION OF THE DRAWINGS

FIG. 1 is a perspective view of the inside compartment of an automobile showing the overlayed floor covering, which in this case is an automobile floor mat, and the carpet gripping devices located in four places under the floor mat;

FIG. 2 is a perspective view of the carpet gripping device being fastened to an overlayed floor covering;

FIG. 3 is a plan view of some carpet gripping devices being attached to an overlayed floor covering;

FIG. 4 is a sectional view showing the base member connected to the overlayed floor covering and showing the prongs gripping the carpeted floor;

FIG. 5 is an enlarged side elevational view of an individual prong;

FIG. 6 is an enlarged plan view showing a portion of the device with the prongs in parallel rows and all of the prongs flowing in the same direction;

FIG. 7 is a plan view of the carpet gripping device showing the flow of the prongs in four different directions.

DESCRIPTION OF THE PREFERRED EMBODIMENTS

Referring now to the drawings, and more particularly FIG. 1, there are shown products, generally designated 10, for holding an overlayed floor covering 12 in place on a carpeted floor 14 in accordance with the present invention. The product 10 basically includes a generally flat base member 18 and a plurality of prongs 16 extending from one side of the base member as shown in FIG. 2. The prongs 16 are fixed at one end into the base member 18. The opposite end of the prongs 16 is used to grip into the carpeted floor 14. The prongs 16 are bent at an angle to aid in the gripping action as shown in FIG. 5. The prongs 16 have a flat cut surface 20 on the free ends for providing a generally smooth surface.

There are probably many ways to manufacture the present invention. It is believed that the best way of manufacturing this invention is to make it through injection molding machines using one mold to form the entire device 10 or 11 out of plastic. This method of manufacture would be fast and inexpensive especially for mass production. Also, the device 10 or 11 would be made as just one part so the only assembling to be done would be attaching the device 10 or 11 to the overlayed floor covering 12. This would eliminate the time and equipment needed to insert the prongs 16 into the base member 18. Since the prongs 16 would be a natural extension of the base member 18 (if made as one piece) there would be less chance that the prongs 16 would ever break off from the base member 18 or become loose. However, the device 10 or 11 could be made using metal prongs and other forms of base material, either plastic, textiles, leather, etc. By using a good quality, sturdy plastic and making the device 10 or 11 one piece, it would be very durable and hold up under the most strenuous use. In fact, the carpet gripping device 10 or 11 would probably have a longer life than the overlayed floor covering 12 itself. Of course, other methods of manufacturing the invention might be just as durable.

A critical part of this invention is a particular step of the manufacturing process. In order to ensure protection to any surface coming in contact with the device 10 or 11 all of the prongs 16 must be cut so that their ends are flat 20 and not pointed. This could be done in a variety of ways using many different apparatus which would be familiar to one who is knowledgeable in the art. By cutting the ends flat 20 on all of the prongs 16 and by spacing all of the prongs 16 preferably within 1/16 inch distance all around from any other prong 16, there is little chance that damage will result to the carpeted floor 14 beneath the prongs 16, or to any other surface coming in contact with the prongs 16.

To ensure that the carpet gripping device 10 or 11 does not move relative to either the carpet 14 or the overlayed floor covering 12 it is thought that the best method of installing the device 10 or 11 is to securely fasten it to the overlayed floor covering 12. This could be accomplished by using retaining studs 24 of some variety or by permanently gluing (with a strong bonding agent) the device 10 or 11 to the underside of the overlayed floor covering 12.

The preferred embodiment of the present invention uses retaining studs 24 as shown in FIGS. 2 and 4. In the embodiment shown in FIG. 6 two studs 24 would be used, one at each end of the device 10. In the embodiment of FIG. 7 one stud 24 would be used in the center of the device 11. A hole would be punched in the overlayed floor covering 12 where a stud 24 would pass through. Hole(s) of the same size would be molded into the carpet-gripping device 10 or 11. The hole(s) in the overlayed floor covering 12 should be reinforced to prevent the floor covering 12 from splitting and to prepare for the retaining stud 24. The hole(s) in the carpet-gripping device 10 or 11 should be threaded to match the threads of the retaining stud 24. Then the stud(s) 24 is simply placed into the hole(s) in the overlayed floor covering 12 and threaded into the hole(s) in the carpet gripping device 10 or 11 until both the device 10 or 11 and the floor covering 12 are tightly held together. The retaining stud 24 connection should be made such that no nuts are needed to keep the stud 24 from loosening. This would be obvious to one skilled in the art. The retaining studs 24 might also be made out of plastic. This mode of connecting the device 10 or 11 to the floor covering 12 would be best for when the floor covering 12 is a car mat. Floor coverings 12 in a home or office would probably use one of the other modes mentioned.

Conceivably, the base member 18 could be the overlayed floor covering 12 itself with the prongs 16 projecting from it. Of course this would have to be accomplished by the maker of the overlayed floor covering 12 and assuming that the overlayed floor covering 12 is, at least in part, composed of a material from which prongs 16 could be made to project out of. Another thought is that the base member 18 could be stitched to the overlayed floor covering with a strong thread of some kind. Whatever method is used to securely connect the base member 18 to the overlayed floor covering 12 would probably be accomplished by mechanical, automated means, simplifying the process, and possibly done in the facility where the overlayed floor covering 12 is manufactured. However, there should be a method available to attach the device 10 or 11 to an overlayed floor covering 12 which has already been purchased. A few of the means already mentioned to fasten the base member 18 to the overlayed floor covering 12 could be performed at home.

FIG. 1 shows the carpet gripping device 10 being used on an automobile floor mat 12. If two devices 10 were used, one should be placed on each longitudinal side of the floor mat 12. FIG. 1 shows four carpet gripping devices 10 being used of the type shown in FIGS. 2-6. Each base member 18 is fastened in place to the underside of the floor mat 12 such that the direction of the angle of the prongs 16 on each base member 18a end up at 90° to the direction of the angle of the prongs 16 on the base members 18b and 18d on the adjacent sides and at 180° to the direction of the angle of the prongs 16 on the base member 18c at the opposite side. This arrangement prevents the floor mat 12 from moving in any direction. However, just two carpet gripping devices 10 under a floor mat 12 with the prongs 16 flowing in opposite directions may be used in the appropriate application. In order to maintain the best possible gripping action it has been found that the prongs 16 must be located very close to each other. Parallel rows of the prongs 16, as shown in FIG. 6, is preferred, and in fact the carpet gripping device 10 used under a floor mat 12 does not have to be any larger than 2" long by ½" wide to effectively work. Of course larger carpet gripping devices 10 could be used in the appropriate application.

FIG. 7 shows another carpet-gripping device 11 according to the present invention. In FIG. 7 the prongs 16 are shown to flow in four different directions emanating from the center of the base member 18. By having the direction of flow of the prongs 16 be in four different directions one carpet gripping device 10 can prevent movement in any of those four directions. This embodiment might be best used under an overlayed floor covering 12 in a home or office because traffic over those overlayed floor coverings 12 could potentially occur in any direction. In this regard, it should be appreciated that a single retainer stud 24 could be employed in the center of the device 11 to secure the device 11 to the floor covering 12. Whether using the embodiment of FIGS. 2-6 or the embodiment of FIG. 7, the angle of each prong 16 would be the same, only the direction of flow of the angle would be different in FIG. 7. The angle of each prong has been found to be best between 30° and 45° off of the vertical but other suitable angles could also be employed in the appropriate application. The directions of flow of the prongs 16 could be other than that shown in FIGS. 2-6 and FIG. 7. Also, the shape of the base members 18 can be other than those shown. Circular, triangular or various other shapes could be used effectively.

As already mentioned, the carpet gripping devices 10 or 11 can be used in any number and placed in any location under the overlayed floor covering 12 depending on the application. The best locations found thus far have been near the outside edge of the overlayed floor covering 12 using two or more carpet gripping devices 10 or in the center of the floor covering using one device 11. Once installed under the overlayed floor covering 12 the prongs 16 will grip the carpeted floor 14 as soon as the floor covering 12 is laid on the carpeted floor 14. The height of each prong 16 protruding from the base member 18 should be at least ⅛" or higher depending upon the thickness of the carpeted floor 14.

It is thought that the carpet gripping devices 10 and 11 of the present invention and many of their attendant advantages will be understood from the foregoing description and it will be apparent that various changes may be made in the form and construction of the parts thereof without departing from the spirit and scope of the invention or sacrificing all of its material advantages, the form hereinbefore described being merely a preferred or exemplary embodiment thereof.

What is claimed is:

1. A carpet-gripping device for inhibiting relative movement between an overlayed floor covering and a carpeted floor beneath the overlayed floor covering, comprising:
   a generally flat base member;
   a plurality of substantially rigid prongs extending from one side of the base member, the prongs having a predetermined, bent, angular shape and the exposed end of each prong cut to provide a flat end surface such that said plurality of prong flat end surfaces are in substantially the same plane forming a generally smooth surface; and
   means for securing the base member to an overlayed floor covering.

2. The carpet gripping device of claim 1, wherein the plurality of prongs are spaced in a dense array to further enhance their gripping capability.

3. The carpet gripping device of claim 1, wherein the prongs all flow in the same direction.

4. The carpet gripping device of claim 1, wherein the prongs flow in four different directions emanating from the center point of the base member.

5. The carpet gripping device of claim 1, wherein each base member is relatively small in size when compared to the size of the overlayed floor covering and is physically independent from any other base member.

6. A carpet gripping device for inhibiting relative movement between an overlayed floor covering and a carpeted floor beneath the floor covering, comprising:
   a generally flat base member;
   a plurality of substantially rigid prongs extending from one side of the base member, the prongs having a predetermined, bent, angular shape, the exposed end of each prong cut to provide a flat end surface such that said plurality of prong flat end surfaces are in substantially the same plane forming a generally smooth surface, and the prongs spaced in a dense array to enhance gripping capability;
   each base member being compact in size and physically independent from any other base member;
   the prongs all flowing in the same direction; and
   means for securing the base member to an overlayed floor covering.

7. The carpet gripping device of claim 6, wherein the prongs flow in four different directions emanating from the center point of the base member.

8. A carpet gripping device for inhibiting relative movement between an automobile floor mat and a carpeted floor beneath the floor mat, comprising:
   a generally flat base member;
   a plurality of substantially rigid prongs extending from one side of the base member, the prongs having a predetermined, bent, angular shape, the exposed end of each prong cut to provide a flat end surface such that said plurality of prong flat end surfaces are in substantially the same plane forming a generally smooth surface, and the prongs spaced in a dense array to enhance gripping capability;
   each base member being compact in size and physically independent from any other base member;
   the prongs all flowing in the same direction; and
   means for securing the base member to an automobile floor mat.

9. The carpet gripping device of claim 8, wherein the prongs flow in four different directions emanating from the center point of the base member.

* * * * *